(12) United States Patent
Wang et al.

(10) Patent No.: US 11,397,890 B2
(45) Date of Patent: Jul. 26, 2022

(54) CROSS-MEDIA RETRIEVAL METHOD BASED ON DEEP SEMANTIC SPACE

(71) Applicant: Peking University Shenzhen Graduate School, Shenzhen (CN)

(72) Inventors: Wenmin Wang, Shenzhen (CN); Mengdi Fan, Shenzhen (CN); Peilei Dong, Shenzhen (CN); Ronggang Wang, Shenzhen (CN); Ge Li, Shenzhen (CN); Shengfu Dong, Shenzhen (CN); Zhenyu Wang, Shenzhen (CN); Ying Li, Shenzhen (CN); Hui Zhao, Shenzhen (CN); Wen Gao, Shenzhen (CN)

(73) Assignee: Peking University Shenzhen Graduate School, Beijing (CN)

( * ) Notice: Subject to any disclaimer, the term of this patent is extended or adjusted under 35 U.S.C. 154(b) by 552 days.

(21) Appl. No.: 16/468,366

(22) PCT Filed: Aug. 16, 2017

(86) PCT No.: PCT/CN2017/097621
§ 371 (c)(1),
(2) Date: Jun. 11, 2019

(87) PCT Pub. No.: WO2018/188240
PCT Pub. Date: Oct. 18, 2018

(65) Prior Publication Data
US 2021/0256365 A1   Aug. 19, 2021

(30) Foreign Application Priority Data

Apr. 10, 2017 (CN) .......................... 201710230070.X

(51) Int. Cl.
  *G06N 3/08* (2006.01)
  *G06N 3/04* (2006.01)
  *G10L 15/16* (2006.01)

(52) U.S. Cl.
  CPC ............ *G06N 3/08* (2013.01); *G06N 3/0445* (2013.01); *G06N 3/0454* (2013.01); *G10L 15/16* (2013.01)

(58) Field of Classification Search
  CPC ...... G06N 3/08; G06N 3/0454; G06N 3/0445; G06N 5/022; G06N 16/3347; G06N 16/483; G10L 15/16; G10L 2015/223
  See application file for complete search history.

(56) References Cited

U.S. PATENT DOCUMENTS

2012/0209847 A1* 8/2012 Rangan ............... G06F 16/3347
  707/769
2021/0125050 A1* 4/2021 Wang ...................... G06N 3/08

FOREIGN PATENT DOCUMENTS

AU   2019101138 A4 * 10/2019 ............. G06N 3/08
WO   WO-2018188240 A1 * 10/2018 ............. G06F 16/00
WO   WO-2021190115 A1 * 9/2021 ............ G06F 16/332

* cited by examiner

*Primary Examiner* — Vijay B Chawan
(74) *Attorney, Agent, or Firm* — SV Patent Service

(57) ABSTRACT

The present application discloses a cross-media retrieval method based on deep semantic space, which includes a feature generation stage and a semantic space learning stage. In the feature generation stage, a CNN visual feature vector and an LSTM language description vector of an image are generated by simulating a perception process of a person for the image; and topic information about a text is explored by using an LDA topic model, thus extracting an LDA text topic vector. In the semantic space learning phase, a training set image is trained to obtain a four-layer Multi-Sensory Fusion Deep Neural Network, and a training set text is trained to (Continued)

obtain a three-layer text semantic network, respectively. Finally, a test image and a text are respectively mapped to an isomorphic semantic space by using two networks, so as to realize cross-media retrieval. The disclosed method can significantly improve the performance of cross-media retrieval.

7 Claims, 4 Drawing Sheets

CROSS-MEDIA RETRIEVAL METHOD BASED ON DEEP SEMANTIC SPACE

TECHNICAL FIELD

The present invention relates to the field of information technology and relates to pattern recognition and multimedia retrieval technology, and specifically, to a cross-media retrieval method based on deep semantic space.

BACKGROUND OF THE INVENTION

With the development and use of the Internet, multimedia data (such as images, text, audio and video) has exploded, and various forms of data is often present at the same time to describe a single object or scene. In order to facilitate the management of diverse multimedia content, we need flexible retrieval between different media.

In recent years, cross-media retrieval has attracted wide attention. The current challenge of cross-media retrieval mainly lies in the heterogeneity and incomparability between different modal features. To solve this problem, heterogeneous features are mapped to homogeneous space in many methods to span the "semantic gap". However, the "perception gap" between the underlying visual features and the high-level user concept is ignored in the existing methods. The perception of the concept of an object is often combined with his visual information and linguistic information for expression, and the association between underlying visual features and high-level user concepts cannot be established; and in the resulting isomorphic space, the semantic information representation of images and texts is missing to some extent. So, the accuracy of the existing methods in the Image Retrieval in Text (Img2Text) and the Text Retrieval in Image (Text2Img) is not high, and the cross-media retrieval performance is relatively low, difficult to meet the application requirements.

SUMMARY OF THE INVENTION

In order to overcome the above deficiencies of the prior art, a cross-media retrieval method based on deep semantic space is proposed in the present invention, which mines rich semantic information in cross-media retrieval by simulating a perception process of a person for the image, realizes cross-media retrieval through a feature generation process and a semantic space learning process, and can significantly improve the performance of cross-media retrieval.

For convenience, the following terms are defined in the present disclosure:
  CNN: Convolutional Neural Network; LSTM: Long Short Term Memory; and a CNN visual feature vector and an LSTM language description vector of corresponding positions are extracted in the feature generation process in the present invention;
  LDA: Latent Dirichlet Allocation, implicit Dirichlet distribution, a document topic generation model;
  MSF-DNN: Multi-Sensory Fusion Deep Neural Network, a Multi-Sensory Fusion Deep Neural Network for an image proposed in the present invention;
  TextNet: semantic network of text proposed in the present invention.

The core of the present invention: A cross-media retrieval method proposed in the present invention comprising a feature generation process and asemantic space learning process, considering that the perception of the concept of an object is often combined with the expression of his visual information and linguistic information, which mines rich semantic information in cross-media retrieval by simulating a perception process of a person for the image. In the feature generation stage, a CNN visual feature vector and a LSTM language description vector of an image are generated by simulating a perception process of a person for the image; and topic information about a text is explored by using a LDA topic model, thus extracting a LDA text topic vector. In the semantic space learning phase, a training set image is trained to obtain a four-layer Multi-Sensory Fusion Deep Neural Network, and a training set text is trained to obtain a three-layer text semantic network, respectively. Finally, a test image and a text are respectively mapped to an isomorphic semantic space by using two networks, so as to realize cross-media retrieval.

The technical solution proposed in the present invention:
A cross-media retrieval method based on deep semantic space, which mines rich semantic information in cross-media retrieval by simulating a perception process of a person for the image, to realize cross-media retrieval; comprising a feature generation process and a semantic space learning process, and specifically, comprising the steps of:
Step 1) obtaining training data, test data and data categories;
  In the embodiment of the present invention, training data and test data are respectively obtained from three data sets of Wikipedia, Pascal Voc, and Pascal Sentence, and each training sample or test sample has one category, that is, one sample corresponds to one category label.
Step 2) Feature generation process, extracting features for images and text respectively;
  Step 21) a CNN visual feature vector and an LSTM language description vector of an image are generated for training and test images by using the Convolutional Neural Network-Long Short Term Memory (CNN-LSTM) architecture proposed in literature [1] (O. Vinyals, A. Toshev, S. Bengio, and others. 2016. Show and Tell: Lessons learned from the 2015 MSCOCO Image Captioning Challenge. PAMI (2016));
  For the N training images, the features of each image are obtained (CNN visual feature vector, LSTM language description vector, real tag value ground-truth label), expressed as $D=(v^{(n)}, d^{(n)}, l^{(n)})_{n=1}^{N}$; and
  Step 22) extracting the "LDA text topic vector" of the training and test text by using the LDA model;
  For the N training texts, the "LDA text topic vector" extracted for each sample is expressed as t.
Step 3) The semantic space learning process comprises of the semantic space learning process of images and the semantic space learning process of texts, mapping images and texts into a common semantic space, respectively;
  Semantic space learning is performed on images and text in the present invention, respectively. In the specific implementation of the present invention, the image is trained to obtain a four-layer Multi-Sensory Fusion Deep Neural Network (MSF-DNN); and a text is trained to obtain a three-layer text semantic network (TextNet). An image and a text are respectively mapped to an isomorphic semantic space by using MSF-DNN and TextNet. The connection of the network and the number of nodes are set as shown in FIG. 2.
  Step 31) constructing an MSF-DNN network for semantic space learning; and
  Step 32) constructing a TextNet network for semantic space learning;
  Thus the image and the text are respectively mapped to an isomorphic semantic space; and Step 4) realizing cross-media retrieval through traditional similarity measurement methods;

Cross-media retrieval of Image Retrieval in Text (Img2Text) and Text Retrieval in Image (Text2Img) can be easily accomplished by using similarity measurement methods such as cosine similarity.

Compared with the prior art, the beneficial effects of the present invention are:

A cross-media retrieval method based on deep semantic space is proposed in the present invention, and a CNN visual feature vector and a LSTM language description vector of an image are generated by simulating a perception process of a person for the image. Topic information about a text is explored by using a LDA topic model, thus extracting a LDA text topic vector. In the semantic space learning phase, a training set image is trained to obtain a four-layer Multi-Sensory Fusion Deep Neural Network, and a training set text is trained to obtain a three-layer text semantic network, respectively. Finally, a test image and a text are respectively mapped to an isomorphic semantic space by using two networks, so as to realize cross-media retrieval.

Compared with the existing methods, the present invention spans the "perception gap" between the underlying visual features and the high-level user concepts, and constructs a homogeneous space with rich semantic information for cross-media retrieval of images and texts. The present invention first proposes two network architectures, MSF-DNN and TextNet, for expressing the semantics of images and texts. Experiments show that this scheme can significantly improve the accuracy of cross-media retrieval; and the accuracy in Image Retrieval in Text (Img2Text) and Text Retrieval in Image (Text2Img) tasks are significantly improved. The present invention can significantly improve cross-media retrieval performance, and has broad application prospects and market demand.

DETAILED DESCRIPTION OF THE INVENTION

The present invention will become apparent from the following detailed description of embodiments and from the accompanying drawings, but not limited to the scope of the invention in any way.

A cross-media retrieval method based on deep semantic space is proposed in the present invention, which mines rich semantic information in cross-media retrieval by simulating a perception process of a person for the image, realizes cross-media retrieval through a feature generation process and a semantic space learning process, and can significantly improve the performance of cross-media retrieval.

Figure 1:
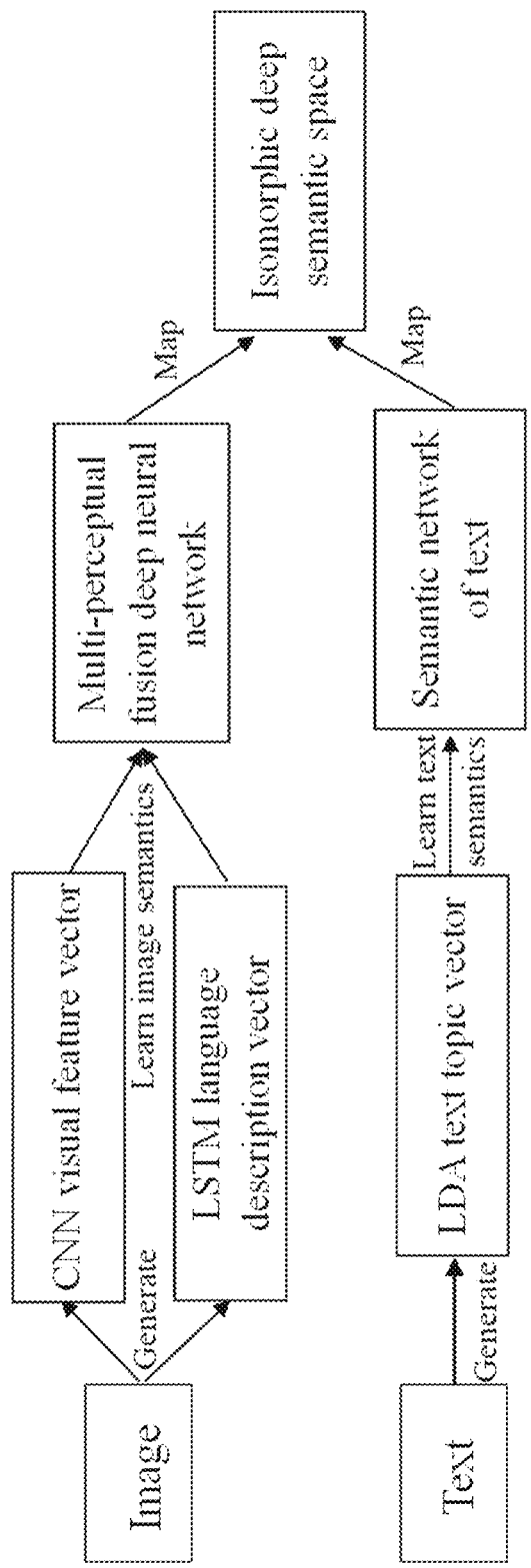
FIG. 1 illustrates a flowchart of the method in the present invention.
Figure 2:
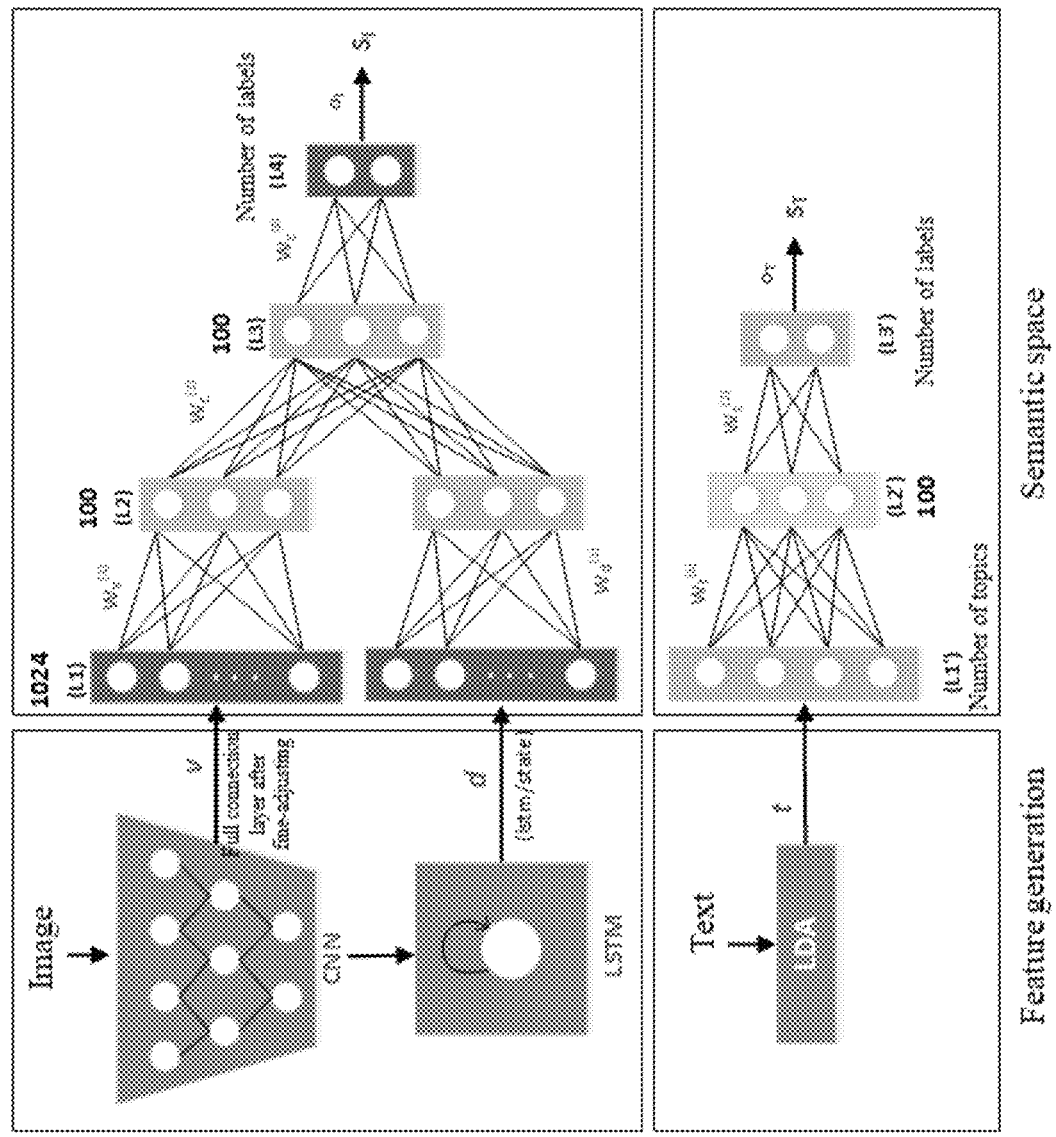
FIG. 2 illustrates a schematic view of feature generation and semantic space learning for images and texts by using the method of the present invention, where the upper left box represents generation of image feature; the lower left box represents generation of text feature; the upper right box represents MSF-DNN; the lower right box represents TextNet; the isomorphic semantic space is obtained in the upper right box and the lower right box; specifically, the image samples are input into CNN-LSTM architecture to obtain the "CNN visual feature vector" and "LSTM language description vector" of the image, which are represented by v and d respectively (upper left box); the text sample is input into the LDA topic model to obtain "LDA text subject vector", denoted by t (lower left box); the upper right part represents a four-layer Multi-Sensory Fusion Deep Neural Network (MSF-DNN) that fuses the input of v and d, aiming to map the image to semantics Space $S_I$ finally; and the lower right part represents a three-layer text semantic network (TextNet), with t as the input, the purpose is to finally map the text to the semantic space $S_T$; and $S_I$ and $S_T$ are isomorphic spaces with the same semantics.

FIG. 1 illustrates a flowchart of a cross-media retrieval method based on deep semantic space according to the present invention; FIG. 2 illustrates a schematic view of feature generation and semantic space learning for images and texts by using the method of the present invention; and specifically, the construction process comprises the steps of:

Step 1: performing feature generation, comprising Step 1) to Step 2).

Step 1) A CNN visual feature vector and an LSTM language description vector of an image are generated for the images by using the CNN-LSTM architecture proposed in literature [1] (O. Vinyals, A. Toshev, S. Bengio, and others. 2016. Show and Tell: Lessons learned from the 2015 MSCOCO Image Captioning Challenge. PAMI (2016)).

Figure 3:
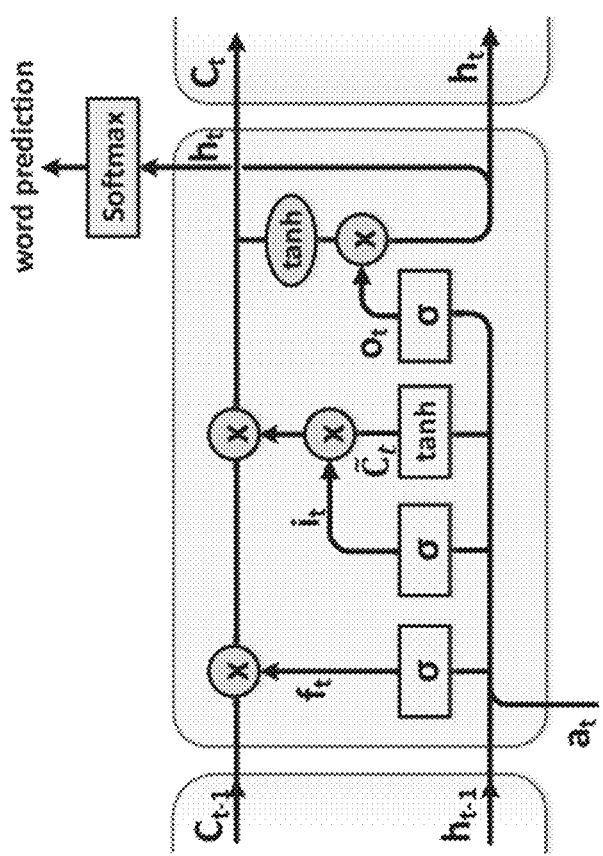
FIG. 3 is a structural diagram of an LSTM (Long Short Term Memory), which illustrates a repetitive LSTM module. In the present disclosure, the tuple $(C_N, h_N)$ at time t=N is taken as the "LSTM language description vector".

The architecture of CNN-LSTM is described in Literature 1. Specifically, the CNN network is fine-adjusted by using the training image of the existing data set in the present invention, and then the output of the last 1,024-dimensional full connection layer are extracted for the training image and the test image as "CNN visual feature vector". FIG. 3 illustrates a structural diagram of an LSTM (Long Short Term Memory). FIG. 3 shows details of the LSTM structure of FIG. 2. When t is equal to the last time N, the tuple $(C_N, h_N)$ is extracted as the "LSTM language description vector" of the training image and the test image; and Step 2) The "LDA text topic vector" is extracted from the training text and the test text by using the text topic model LDA.

Figure 4:
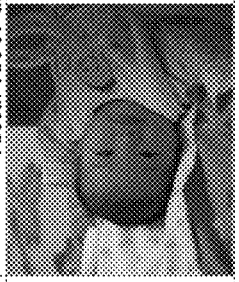
FIG. 4 illustrates an example of text topics generated by LDA on a Wikipedia data set in accordance with the embodiment of the present invention, wherein the three topics of (a) collectively describe the category of "war". The keywords distributed in the three topics are: Topic 1: pilot, fight, war, military, flying, staff; Topic 2: harbor, shot, launched, air, group, aircraft; and Topic 3: plane, cruisers, flights, attacked, bombs, force; the three topics of (b) collectively describe the category of "Royal". The keywords distributed in the three topics are: Topic 1: fortune, aristocrat, palace, prince, louis, throne; Topic 2: princess, royal, queen, grand, duchess, Victoria; and Topic 3: king, duke, crown, reign, lord, sovereign.

FIG. 4 shows an example of six topics generated by LDA aggregation on a Wikipedia data set, and each topic is represented by six keywords of the same color. In the specific embodiment of the present invention, after repeated test, the optimal number of topics selected for the three data sets of Wikipedia, Pascal Voc, and Pascal Sentence are 200, 100, and 200, respectively.

Step 2: Then carrying out semantic space learning. Step 3) to Step 6) represents the process of semantic space learning by using the architecture of MSF-DNN network. Step 7) to Step 8) represents the process of semantic space learning by using the architecture of TextNet network.

Step 3) Suppose that there are N training pictures. Features are generated after Step 1) to Step 2), and the features of each picture are got (CNN visual feature vector, LSTM language description vector, ground-truth label), expressed as $D=(v^{(n)},d^{(n)},l^{(n)})_{n=1}^{N}$. l represents the l(l≥2) of the l-th layer of the neural network. Let $x^j$ denote the input vector of the l–1-th layer. And the value $z_i^{(l)}$ before the i-th activation of the l-th layer is expressed as Formula 1:

$$z_i^{(l)} = \sum_{j=1}^{m} W_{ij}^{(l-1)} x_j + b_i^{(l-1)} \qquad (1)$$

Where m is the number of units in the l–1-th layer; $W_{ij}^{(l-1)}$ represents the weight between the j-th unit of the l–1-th layer and the i-th unit of the l-th layer; and $b_i^{(l-1)}$ represents the weight associated with the i-th unit of the l-th layer.

Step 4) The activation value for each z is calculated by Formula 2:

$$f_I^{(l)}(z) = \begin{cases} 1/(1+e^{-z}) & l = 2, 3 \\ e^{(z-\varepsilon)} / \sum_{k=1}^{K} e^{(z_k-\varepsilon)} & l = 4 \end{cases} \qquad (2)$$

l indicates the number of layers, K is the number of labels, $\varepsilon=\max(z_k)$; $f_I^{(l)}(z)$ represents the activation value of z; function $f_I$: The activation function of all hidden layers uses the Sigmoid function. The last output layer uses the Softmax function.

Step 5) Further, as shown in the upper right part of FIG. 2, the MSF-DNN network is defined as:

$$h_v^{(2)} = f_I^{(2)}(W_v^{(1)} \cdot v + b_v^{(1)}) \qquad (3)$$

$$h_d^{(2)} = f_I^{(2)}(W_d^{(1)} \cdot d + b_d^{(1)}) \qquad (4)$$

$$h_c^{(3)} = f_I^{(3)}(W_c^{(2)} \cdot [h_v^{(2)}, h_d^{(2)}] + b_c^{(2)}) \qquad (5)$$

$$o_I = f_I^{(4)}(W_c^{(3)} \cdot h_c^{(3)} + b_c^{(3)}) \qquad (6)$$

where $h_A^{(l)}$ represents a hidden layer with a depth of l, $o_I$ represents the last layer of the output layer; $W_A^{(l)}$ represents a weight matrix; $b_A^{(l)}$ represents an offset (when l=1, A=v or d, otherwise A=c); v is the CNN visual feature vector; d is the LSTM language description vector; and c is the output after fusion of the two values;

Step 6) The objective function is to minimize the overall error C of the training sample to learn to obtain a parameter space $\Omega=(W_A^{(l)}, b_A^{(l)})$, expressed as Formula 7:

$$C = \underset{\Omega}{\operatorname{argmin}} \frac{1}{2N} \sum_{n=1}^{N} \|o_I^{(n)} - l^{(n)}\|^2 + \frac{\lambda_I}{2} \sum_{l=1}^{3} \|W_A^{(l)}\|_F^2 \qquad (7)$$

$\lambda_I$ is the parameter of the second weight attenuation term.

Step 7) The construction process of TextNet in $3^{rd}$ layer is similar to MSF-DNN. As shown in the lower right part of FIG. 2, assuming that there are N training texts, and the "LDA text subject vector" of each sample is represented as t. The full connection layer of the second layer uses the Sigmoid activation function and then uses the output as the input to the last layer of the Softmax classifier. The definition of the TextNet network is expressed as Formula 8 and Formula 9:

$$h_t^{(2)} = f_T^{(2)}(W_t^{(1)} \cdot t + b_t^{(1)}) \qquad (8)$$

$$o_T = f_T^{(3)}(W_t^{(2)} \cdot h_t^{(2)} + b_t^{(2)}) \qquad (9)$$

where $h_t^{(2)}$ represents the second layer of hidden layer, and $o_T$ represents the last layer of the output layer. $W_t^{(l')}$ represents the weight matrix; $b_t^{(l')}$ represents the offset, and l' represents the number of layers of TextNet.

Step 8) The objective function is to minimize the overall error C' of the training sample to learn to obtain a parameter space $\Omega'=(W_t^{(l')}, b_t^{(l')})$, expressed as Formula 10:

$$C' = \underset{\Omega'}{\operatorname{argmin}} \frac{1}{2N} \sum_{n=1}^{N} \|o_T^{(n)} - l^{(n)}\|^2 + \frac{\lambda_T}{2} \sum_{l=1}^{2} \|W_t^{(l')}\|_F^2 \qquad (10)$$

$\lambda_T$ is the parameter of the second weight attenuation term.

Step 9) After the test image and text are mapped into the isomorphic semantic space by MSF-DNN and TextNet, for an image vector $S_I \in R^K$, and the text vector $S_T \in R^K$, the cosine distance is used to represent the similarity between any image and text feature, calculated by Formula 11:

$$d(S_I, S_T) = \frac{\sum_{k=1}^{K} S_I(k) \times S_T(k)}{\sqrt{\sum_{k=1}^{K} S_I(k)^2} \times \sqrt{\sum_{k=1}^{K} S_T(k)^2}} \qquad (11)$$

where K is the dimension of the feature.

The similarity between the image and the text features is obtained. Sort by similarity from high to low. The top k samples with the highest similarity can be taken as the retrieval result, so as to realize cross-media retrieval.

Figure 5:
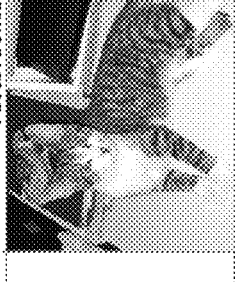
FIG. 5 illustrates a flowchart of an example of a data set adopted in the embodiment of the present invention, where the text of the Wikipedia data set appears as a paragraph, the text of the Pascal Voc data set appears as a label, the text of the Pascal Sentence data set appears as a sentence; and the category of each image text pair is indicated in the brackets.

FIG. 5 illustrates an example of a data set adopted in the embodiment of the present invention; wherein the text of the Wikipedia data set appears in paragraph form, the text of the PascalVoc data set appears in the form of a label, and the text of the Pascal Sentence data set appears as a sentence. The category of each image text pair is indicated in the parentheses. Table 1~3 show the cross-media retrieval effects on Wikipedia, Pascal Voc and Pascal Sentence data sets in the present invention and comparison with existing methods. The existing methods in Table 1~3 correspond to the methods described in Literature [2]~[10] respectively:

[2] J. Pereira, E. Coviello, G. Doyle, and others. 2013. On the role of correlation and abstraction in cross-modal multimedia retrieval. IEEE Transactions on Software Engineering (2013).

[3] A. Habibian, T. Mensink, and C. Snoek. 2015. Discovering semantic vocabularies for cross-media retrieval. In ACM ICMR.

[4] C. Wang, H. Yang, and C. Meinel. 2015. Deep semantic mapping for cross-modal retrieval. In ICTAI.

[5] K. Wang, R. He, L. Wang, and W. Wang. 2016. Joint feature selection and subspace learning for cross-modal retrieval. PAMI(2016).

[6] Y. Wei, Y. Zhao, C. Lu, and S. Wei. 2016. Cross-modal retrieval with CNN visual features: A new baseline. IEEE Transactions on Cybernetics (2016).

[7] J. Liang, Z. Li, D. Cao, and others. 2016. Self-paced cross-modal subspace matching. In ACM SIGIR.

[8] Y. Peng, X. Huang, and J. Qi. 2016. Cross-media shared representation by hierarchical learning with multiple deep networks. In IJCAI.

[9] K. Wang, R. He, W. Wang, and others. 2013. Learning coupled feature spaces for cross-modal matching. In ICCV

[10] N. Rasiwasia, J. Costa Pereira, E. Coviello, and others. 2010. A new approach to cross-modal multimedia retrieval. In ACM MM.

In Tables 1~3, the retrieval effect is measured by mAP value. The higher the mAP value is, the better the retrieval effect is.

TABLE 1

Retrieval results on Wikipedia data set

| Method | Image Retrieval in Text (Img2Text) | Text Retrieval in Image (Text2Img) | Average |
| --- | --- | --- | --- |
| SCM-2014 [2] | 0.362 | 0.237 | 0.318 |
| DSV [3] | 0.450 | 0.516 | 0.483 |
| DSM [4] | 0.340 | 0.353 | 0.347 |
| JFSSI [5] | 0.306 | 0.228 | 0.267 |
| NewBaseline [6] | 0.430 | 0.370 | 0.400 |
| SCSM [7] | 0.274 | 0.217 | 0.245 |
| CMDN [8] | 0.393 | 0.325 | 0.359 |
| Present invention | 0.518 | 0.453 | 0.486 |

TABLE 2

Retrieval results on Pascal Voc data set

| Method | Image Retrieval in Text (Img2Text) | Text Retrieval in Image (Text2Img) | Average |
| --- | --- | --- | --- |
| LCFS [9] | 0.344 | 0.267 | 0.306 |
| JFSSI [5] | 0.361 | 0.280 | 0.320 |
| SCSM [7] | 0.375 | 0.282 | 0.329 |
| Present invention | 0.794 | 0.804 | 0.799 |

TABLE 3

Retrieval results on the Pascal Sentence data set

| Method | Image Retrieval in Text (Img2Text) | Text Retrieval in Image (Text2Img) | Average |
| --- | --- | --- | --- |
| SM-10 [10] | 0.530 | 0.514 | 0.522 |
| LCFS [9] | 0.466 | 0.483 | 0.475 |
| NewBaseline [6] | 0.496 | 0.460 | 0.478 |
| CMDN [8] | 0.334 | 0.333 | 0.334 |
| Present invention | 0.573 | 0.557 | 0.565 |

It can be seen from the table that the TextNet network architecture in the present invention is applicable to data sets of texts of different lengths. MSF-DNN network architecture performs multi-sensory fusion of visual vectors and language description vectors of image to further eliminate the "perception gap" of image feature representations. Compared with the existing methods, the accuracy of the two cross-media retrieval tasks of the Image Retrieval in Text (Img2Text) and the Text Retrieval in Image (Text2Img) is significantly improved.

It is to be noted that the above contents are further detailed description of the present invention in connection with the disclosed embodiments. The invention is not limited to the embodiments referred to, but may be varied and modified by those skilled in the field without departing from the conception and scope of the present invention. The claimed scope of the present invention should be defined by the scope of the claims.

What is claimed is:

1. A cross-media retrieval method based on deep semantic space, comprising:

mining semantic information in cross-media retrieval by simulating a perception process of a person for the image, to accomplish cross-media retrieval, which comprises a feature generation process and a semantic space learning process, the cross-media retrieval method further comprising:

Step 1) obtaining training data, test data and data categories;

Step 2) in the feature generation process, extracting features for images and text respectively, comprising:

Step 21) generating a CNN visual feature vector and an LSTM language description vector of an image for training and test images by using the Convolutional Neural Network-Long Short Term Memory (CNN-LSTM);

for the N training images, obtaining the features of each image (CNN visual feature vector, LSTM language description vector, real tag value ground-truth label), which is expressed as $D=(v^{(n)}, d^{(n)}, l^{(n)})_{n=1}^{N}$,. 1 represents the 1-th layer of the Convolutional Neural Network, and l≥2; and Step 22) using the document topic to generate the model LDA, and extracting the "LDA text topic vector" of the training and test text; for N training texts, the "LDA text topic vector" extracted for each sample is represented as t;

Step 3) in the semantic space learning process comprising a semantic space learning process of images and a semantic space learning process of texts, respectively mapping images and texts into a common semantic space;

Step 31) in the semantic space learning process of images: constructing a four-layer Multi-Sensory Fusion Deep Neural Network MSF-DNN for semantic space learning, and obtaining a parameter space $\Omega=(W_A^{(l)}, b_A^{(l)})$ where $W_A^{(l)}$ represents the weight matrix, $b_A^{(l)}$ represents the offset, and l represents the number of layers; and Step 32) in the semantic space learning process of texts, constructing a three-layer text semantic network TextNet for semantic space learning, and a parameter space $\Omega'=(W_t^{(l')}, b_t^{(l')})$ is obtained; $W_t^{(l')}$ represents the weight matrix; $b_t^{(l')}$ represents the offset; and l' represents the number of layers of TextNet, which map the image and text to an isomorphic semantic space through MSF-DNN and TextNet; and Step 4) calculating the similarity between any image and text using a similarity measurement method, and accomplishing the cross-media retrieval of the Image Retrieval in Text (Img2Text) and Text Retrieval in Image (Text2Img).

2. A cross-media retrieval method according to claim 1, wherein in Step 1), training data, test data, and obtaining data categories through the data sets Wikipedia, Pascal Voc, and Pascal Sentence.

3. A cross-media retrieval method according to claim 1, wherein in Step 21), generating a CNN visual feature vector and a LSTM language description vector of an image for training and test images by using the Convolutional Neural Network-Long Short Term Memory (CNN-LSTM) architecture, wherein the CNN network is fine-adjusted by using the training image of the existing data set, and then the output of the last 1,024-dimensional full connection layer is extracted for the training image and the test image as "CNN visual feature vector", wherein the extraction of LSTM language description vector includes: in Long Short Term Memory (LSTM), when t is equal to the last time N, extracting the tuple $(C_N, h_N)$ as the "LSTM language description vector" of the training image and the test image.

4. A cross-media retrieval method according to claim 1, wherein in Step 22), optimal numbers of topics selected for the three data sets of Wikipedia, Pascal Voc, and Pascal Sentence are 200, 100, and 200, respectively.

5. A cross-media retrieval method according to claim 1, wherein in Step 31), the semantic space learning process for the image comprises:

Step 311) for N training images, generating features after Step 21, and getting the features of each picture, expressed as $D=(v^{(n)},d^{(n)},l^{(n)})_{n=1}^{N}$, where l represents the l-th layer (l≥2) of the neural network, $x^j$ denotes the input vector of the l−1-th layer, wherein the value $z_i^{(l)}$ before the i-th activation of the l-th layer is expressed as the Formula 1:

$$z_i^{(l)} = \sum_{j=1}^{m} W_{ij}^{(l-1)} x_j + b_i^{(l-1)} \quad (1)$$

where m is the number of units in the l−1-th layer; $W_{ij}^{(l-1)}$ represents the weight between the j-th unit of the l−1-th layer and the i-th unit of the l-th layer; and $b_i^{(l-1)}$ represents the weight associated with the i-th unit of the l-th layer;

Step 312) calculating the activation value $f_I^{(l)}(z)$ for each z by Formula 2, where the activation function of all hidden layers uses the Sigmoid function, the last output layer uses the Softmax function for activation:

$$f_I^{(l)}(z) = \begin{cases} 1/(1+e^{-z}) & l=2,3 \\ e^{(z-\varepsilon)} / \sum_{k=1}^{K} e^{(z_k-\varepsilon)} & l=4 \end{cases} \quad (2)$$

where l represents the number of layers, K is the number of labels, and $\varepsilon=\max(z_k)$;

Step 313) defining the MSF-DNN network as Formula 3-6:

$$h_v^{(2)} = f_I^{(2)}(W_v^{(1)} \cdot v + b_v^{(1)}) \quad (3)$$

$$h_d^{(2)} = f_I^{(2)}(W_d^{(1)} \cdot d + b_d^{(1)}) \quad (4)$$

$$h_c^{(3)} = f_I^{(3)}(W_c^{(2)} \cdot [h_v^{(2)}, h_d^{(2)}] + b_c^{(2)}) \quad (5)$$

$$o_I = f_I^{(4)}(W_c^{(3)} \cdot h_c^{(3)} + b_c^{(3)}) \quad (6)$$

where $h_A^{(l)}$ represents a hidden layer with a depth of l, $o_I$ represents the last layer of the output layer; $W_A^{(l)}$ represents a weight matrix; $b_A^{(l)}$ represents an offset; when l=1, A=v or d, otherwise A=c; and c is the output after the fusion of the two values; and Step 314) minimizing an overall error C of the training sample using an objective function to learn to obtain a parameter space $\Omega=(W_A^{(l)}, b_A^{(l)})$, expressed as Formula 7:

$$C = \underset{\Omega}{\arg\min} \frac{1}{2N} \sum_{n=1}^{N} \|o_I^{(n)} - l^{(n)}\|^2 + \frac{\lambda_1}{2} \sum_{l=1}^{3} \|W_A^{(l)}\|_F^2 \quad (7)$$

where $\lambda_I$ is a parameter of the second weight attenuation term.

6. A cross-media retrieval method according to claim 1, wherein in Step 32), the semantic space learning process of texts comprises:

Step 321) for N training text samples, wherein the "LDA text subject vector" of each sample is represented as t, the full connection layer of the second layer uses the Sigmoid activation function and then uses the output as the input to the last layer of the Softmax classifier, expressing a definition of the TextNet network using Formula 8 and Formula 9:

$$h_t^{(2)} = f_T^{(2)}(W_t^{(1)} \cdot t + b_t^{(1)}) \quad (8)$$

$$o_T = f_T^{(3)}(W_t^{(2)} \cdot h_t^{(2)} + b_t^{(2)}) \quad (9)$$

where $h_t^{(2)}$ represents the second layer of hidden layer, $o_T$ represents the last layer of the) output layer; $W_t^{(l')}$ represents the weight matrix; $b_t^{(l')}$ represents the offset, and l' represents the number of layers of TextNe; and Step 322) minimizing an overall error C of the training sample using an objective function to learn to obtain a parameter space $\Omega=(W_t^{(l')}, b_t^{(l')})$, expressed as Formula 10:

$$C' = \underset{\Omega'}{\arg\min} \frac{1}{2N} \sum_{n=1}^{N} \|o_T^{(n)} - l^{(n)}\|^2 + \frac{\lambda_T}{2} \sum_{l=1}^{2} \|W_t^{(l')}\|_F^2 \quad (10)$$

in which $\lambda_T$ is the parameter of the second weight attenuation term.

7. A cross-media retrieval method according to claim 1, wherein in Step 4), the similarity measurement method uses a cosine distance to represent the similarity between any image and any text feature, and for an image vector $S_I \in R^K$, and the text vector $S_T \in R^K$, the cosine distance $d(S_I, S_T)$ is calculated by Formula 11:

$$d(S_I, S_T) = \frac{\sum_{k=1}^{K} S_I(k) \times S_T(k)}{\sqrt{\sum_{k=1}^{K} S_I(k)^2} \times \sqrt{\sum_{k=1}^{K} S_T(k)^2}} \quad (11)$$

where K is the dimension of the feature, the calculatedd ($S_I$, $S_T$) is taken as the similarity between the image and the text features. Sort by similarity from high to low, the top k samples with the highest similarity is taken as the retrieval result, to accomplish cross-media retrieval.

* * * * *